(12) United States Patent
Pan

(10) Patent No.: US 10,017,118 B2
(45) Date of Patent: Jul. 10, 2018

(54) REPLACEABLE AUTOMOBILE INTERIOR REARVIEW MIRROR BRACKET

(71) Applicant: Global Media Industry Group Co., Ltd., Shenzhen (CN)

(72) Inventor: Lei Pan, Shenzhen (CN)

(73) Assignee: Global Media Industry Group Co., Ltd., Shenzhen, Guangdong (CN)

( * ) Notice: Subject to any disclaimer, the term of this patent is extended or adjusted under 35 U.S.C. 154(b) by 0 days.

(21) Appl. No.: 15/204,778

(22) Filed: Jul. 7, 2016

(65) Prior Publication Data
US 2016/0318447 A1    Nov. 3, 2016

Related U.S. Application Data

(63) Continuation-in-part of application No. PCT/CN2014/093641, filed on Dec. 11, 2014.

(30) Foreign Application Priority Data

Aug. 1, 2014   (CN) .................... 2014 2 0434347 U

(51) Int. Cl.
*F16M 11/00*   (2006.01)
*B60R 1/04*   (2006.01)
(Continued)

(52) U.S. Cl.
CPC .............. *B60R 1/04* (2013.01); *F16M 11/14* (2013.01); *F16M 11/2078* (2013.01)

(58) Field of Classification Search
CPC .............. B60R 1/02; B60R 1/025; B60R 1/04
(Continued)

(56) References Cited

U.S. PATENT DOCUMENTS 5,321,556 A   6/1994   Joe
5,572,354 A   11/1996  Desmond et al.
(Continued)

FOREIGN PATENT DOCUMENTS

CN   202271907 U   6/2012
JP   4791241 B2   10/2011

OTHER PUBLICATIONS

"Australian Application Serial No. 2014402007, Examination Report dated Jan. 31, 2017", 3 pgs.
(Continued)

*Primary Examiner* — Steven M Marsh
(74) *Attorney, Agent, or Firm* — Schwegman Lundberg & Woessner, P.A.

(57) ABSTRACT

A replaceable automobile interior rearview mirror bracket comprises a support base (1) arranged in a body (6) of an automobile interior rearview mirror and an Original Equipment Manufacturer base (2) arranged on an automobile windshield (7), and a replaceable support (3) arranged between the support base (1) and the OEM base (2). The replaceable support (3) includes a ball head base (31), a support pipe (32), and a conversion head (35). The ball head base (31) is fixed with the OEM base (2), the support base (1) is provided with a connector (4), the connector (4) is connected with the conversion head (35) on the replaceable support (3), and the connector (4) is fixed with the replaceable support (3) through a fastening screw (5). The present application, realizing replacement of a double-ball-head support or a three-ball-head support, has advantages of easy disassembling and assembling, safety, reliability and the like.

4 Claims, 16 Drawing Sheets

(51) Int. Cl.
*F16M 11/14* (2006.01)
*F16M 11/20* (2006.01)

(58) Field of Classification Search
USPC .............. 248/475.1, 476, 481, 205.1, 205.2; 359/871, 872
See application file for complete search history.

(56) References Cited

U.S. PATENT DOCUMENTS

| | | | | |
|---|---|---|---|---|
| 5,931,440 | A | 8/1999 | Miller | |
| 6,428,172 | B1* | 8/2002 | Hutzel | B60R 1/12 359/265 |
| 8,474,990 | B2* | 7/2013 | Hwang | B60R 1/04 359/844 |
| 2004/0195486 | A1* | 10/2004 | Rumsey | B60R 1/04 248/481 |
| 2013/0076904 | A1* | 3/2013 | Heslin | B60R 1/04 348/148 |
| 2017/0129406 | A1* | 5/2017 | Uken | B60R 1/12 |

OTHER PUBLICATIONS

"Australian Application Serial No. 2014402007, Notice of Acceptance dated Apr. 5, 2017", 3 pgs.

"Australian Application Serial No. 2014402007, Response filed Mar. 3, 2017 to Examination Report dated Jan. 31, 2017", 17 pgs.

"European Application Serial No. 14898521.1, Extended European Search Report dated Oct. 25, 2016", 6 pgs.

"European Application Serial No. 14898521.1, Office Action dated Nov. 11, 2016", 1 pg.

"European Application Serial No. 14898521.1, Response filed Mar. 8, 2017 to Office Action dated Nov. 11, 2016", 33 pgs.

"International Application Serial No. PCT/CN2014/093641, International Preliminayr Report on Patentability dated Feb. 16, 2017", (w/ English Translation), 11 pgs.

"International Application Serial No. PCT/CN2014/093641, International Search Report dated Apr. 27, 2015", (w/ English Translation), 6 pgs.

"International Application Serial No. PCT/CN2014/093641, Written Opinion dated Apr. 27, 2015", (w/ English Translation), 8 pgs.

"Japanese Application Serial No. 2016-549438, Decision to Grant dated Sep. 19, 2017", (w/ English Translation), 6 pgs.

"Japanese Application Serial No. 2016-549438, Office Action dated Jun. 6, 2017", (w/ English Translation), 6 pgs.

"Japanese Application Serial No. 2016-549438, Written Argument and Amendmen filed Sep. 4, 2017 t in response to Office Action dated Jun. 6, 2017", (w/ English Translation), 12 pgs.

\* cited by examiner

REPLACEABLE AUTOMOBILE INTERIOR REARVIEW MIRROR BRACKET

CLAIM OF PRIORITY

This application claims the benefit of priority of International Patent Application No. PCT/CN2014/093641, filed on Dec. 11, 2014, and published as WO 2016/015429 A1 on Feb. 4, 2016, which claims the benefit of priority of Chinese Patent Application No. 201420434347.2, filed on Aug. 1, 2014, the benefit of priority of each of which is claimed hereby, and each of which is incorporated by reference herein in its entirety.

TECHNICAL FIELD

The present application relates to the field of automobile parts, and particularly to a replaceable automobile interior rearview mirror bracket (support), and also to a rearview mirror bracket having a screw for locking at a front face and a wire passing at a side face.

BACKGROUND ART

Although some of existing automobile interior rearview mirrors are equipped with supports, it is hard to exchange the supports between different automobile interior rearview mirrors. In the market of post-installing of automobile parts, people sometimes would like to remove the original equipment manufacturer (OEM) support, and to reinstall a better rearview mirror support, which can be adjusted within a larger range of angle. OEM supports are generally classified to two types. One type is a single-ball-head support, as shown in FIG. 1, wherein a support base is above an automobile interior rearview mirror. For this type of support, a solution of replacing a rear portion of the support has been available in the market. The other type of OEM rearview mirror supports include a double-ball-head support and a three-ball-head support, as shown in FIG. 2 and FIG. 3, wherein bases of this type of supports are generally installed in front of an automobile interior rearview mirror. No perfect solution has been available in the market for replacing such type of supports yet.

DISCLOSURE OF THE INVENTION

The technical problems to be solved in the present application are to provide an automobile interior rearview mirror support which can ensure good impact resistance, a high safety coefficient, and a large adjustment angle range of an automobile interior rearview mirror, wherein through adjustment of a ball-clamping means, the problem of a conventional product that the support cannot be replaced is solved, and it is realized that the automobile interior rearview mirror can be adjusted by different angles. In order to solve the above technical problems, the present application uses a technical solution as follows.

A replaceable automobile interior rearview mirror support comprises a support base arranged in an automobile interior rearview mirror and an OEM base arranged on an automobile windshield, and further comprises a replaceable support arranged between the support base and the OEM base, wherein the replaceable support comprises a ball head base, a support pipe, and a conversion head, the ball head base is fixed with the OEM base, the support base is provided with a connector, the connector is connected with the conversion head on the replaceable support, and the connector and the replaceable support are fixed through a fastening screw.

A spring and a ball pad are arranged within the support pipe of the replaceable support. A screw hole having a circular groove is arranged in a central portion of the connector. A through hole is arranged in a central portion of the conversion head.

One end of the connector connected with the conversion head is provided with inner bevel chamfers at two sides, forming a round groove.

One end of the conversion head connected with the connector is provided with outer bevel chamfers at two sides, with the outer bevel chamfers matched with the inner bevel chamfers of the connector.

According to the other aspect of the present application, it provides a replaceable automobile interior rearview mirror support, comprising a support body, a fixing screw, and a ball head which are connected, wherein the support body comprises a first connecting portion, and the ball head comprises a second connecting portion, wherein the first connecting portion and the second connecting portion are connected, the fixing screw passes through the first connecting portion and the second connecting portion to be connected with the ball head; a side portion of the ball head is provided with a wire passing-through hole through the ball head.

Further, the first connecting portion has an outward-projecting structure, and the second connecting portion has an inward-recessed structure.

Further, an outer profile of the first connecting portion and an inner profile of the second connecting portion are matched.

Further, the outer profile of the first connecting portion has a polyhedron structure.

Further, a side face of the first connecting portion is an oblique face.

Further, an inner profile of the second connecting portion and an outer profile of the first connecting portion are matched, and the outer profile of the first connecting portion is a square pyramid.

Further, the fixing screw comprises a rod head and a rod body which are connected, and the rod head is located at the outside of the first connecting portion.

Further, the ball head is provided with a threaded hole, the threaded hole communicates with the second connecting portion, an axis of the threaded hole is overlapped with the axis of the ball head.

Further, an axis of the wire passing-through hole crosses an axis of the threaded hole.

Further, the support body is in an L shape or an arc shape. The present application, because of the above structure adopted, can flexibly coordinate with the automobile interior rearview mirror, wherein the connector is designed with a structure matched with the support base in the automobile interior rearview mirror, the replaceable support is designed with a structure matched with the OEM base, and the connector and the replaceable support are fixed through the fastening screw, thereby the support base, the connector, and the replaceable support with the conversion head can be connected as a whole, to make the present application and the automobile interior rearview mirror assembled into one integrated product, which is able to not only well solve the problem that the conventional OEM double-ball-head and three-ball-head supports cannot be replaced, but also facilitate the disassembly and assembly. In the present application, the connector and the conversion head are locked through the fastening screw, ensuring that the two parts will not loosen in terms of radial positions, and in order to prevent looseness of the two parts in terms of axial positions, the present application uses a design in which a bevel chamfer is assembled with a bevel chamfer, wherein at the assembling positions of the two parts, one part, i.e. the connector, has bevel chamfers at two sides forming a round groove, and the other part, i.e. the conversion head, has an end face with bevel chamfers at two sides, wherein the portion with the bevel chamfers of the conversion head is inserted into the groove of the bevel chamfers of the connector, to make the bevel chamfers contacted, which then achieves, in combination with the locking through the screw, the object of simple, practical, and firm assembling. In addition, in the present application, the fastening is made inventively through the fastening screw inside the replaceable support and through the spring, to hide the screw in the replaceable support, invisible to human eyes, rendering a beautiful appearance, safety, and reliability.

The characteristics and the advantages of the present application will become clearer after reading the detailed description of embodiments of the present application in conjunction with figures.

Figure 1:
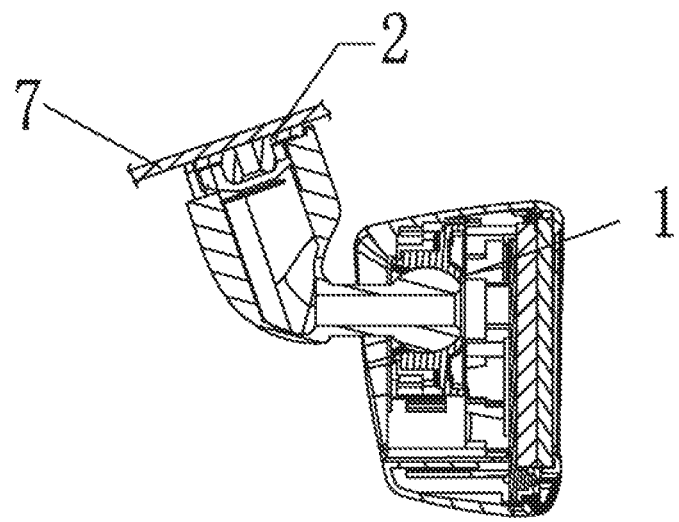
FIG. 1 is a cross-sectional diagrammatic view in which an OEM single-ball-head support is assembled with an automobile interior rearview mirror.
Figure 2:
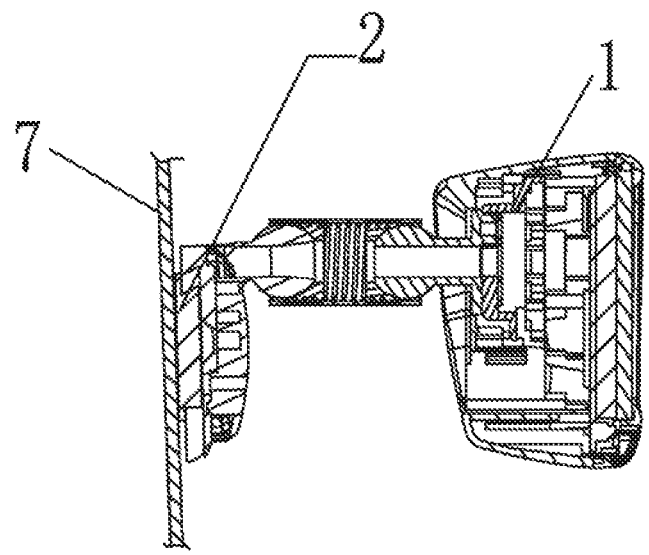
FIG. 2 is a sectional schematic diagram of an OEM double-ball-head support.
Figure 3:
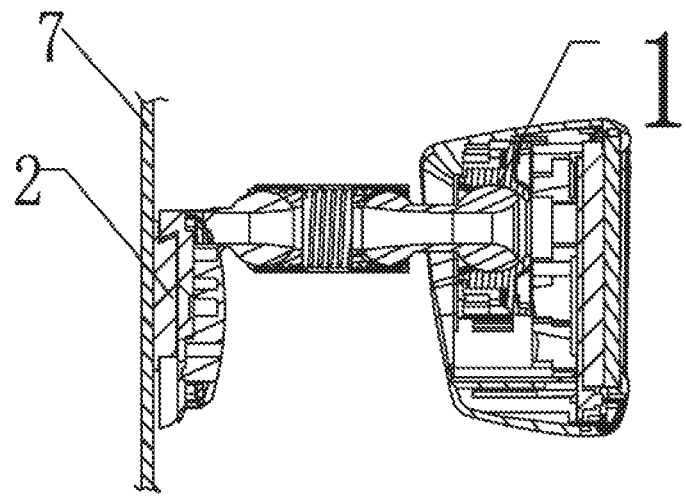
FIG. 3 is a sectional schematic diagram of a conventional three-ball-head support.
Figure 4:
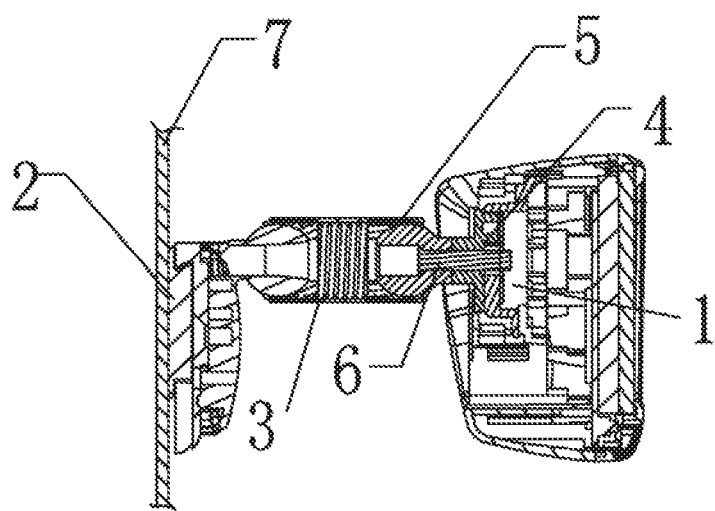
FIG. 4 is a sectional schematic diagram showing the replaceable support of Example 1 of the present application is installed to an automobile interior rearview mirror.
Figure 5:
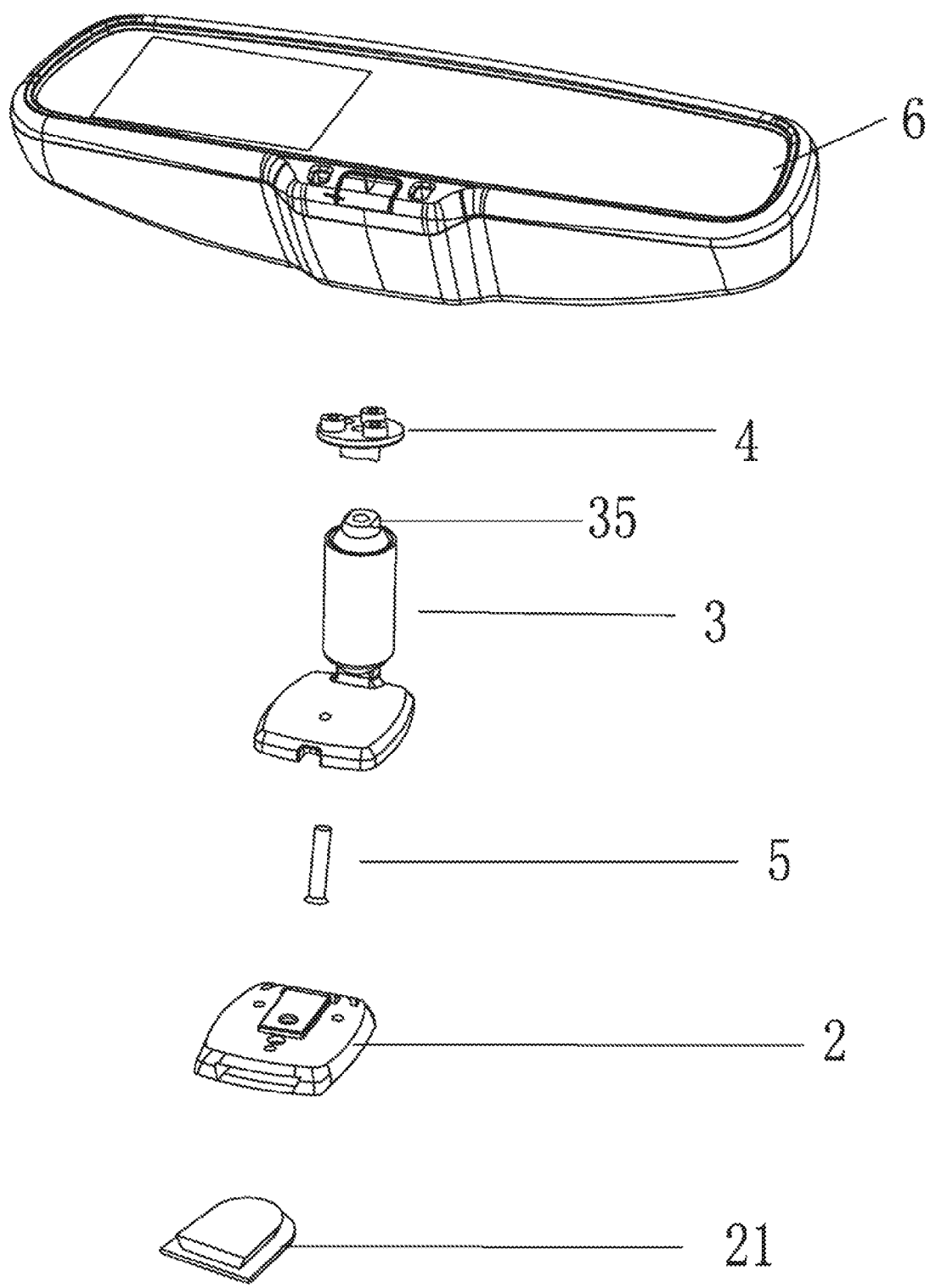
FIG. 5 is a schematic diagram of integrally assembling the replaceable support of Example 1 of the present application with the automobile interior rearview mirror.
Figure 6:
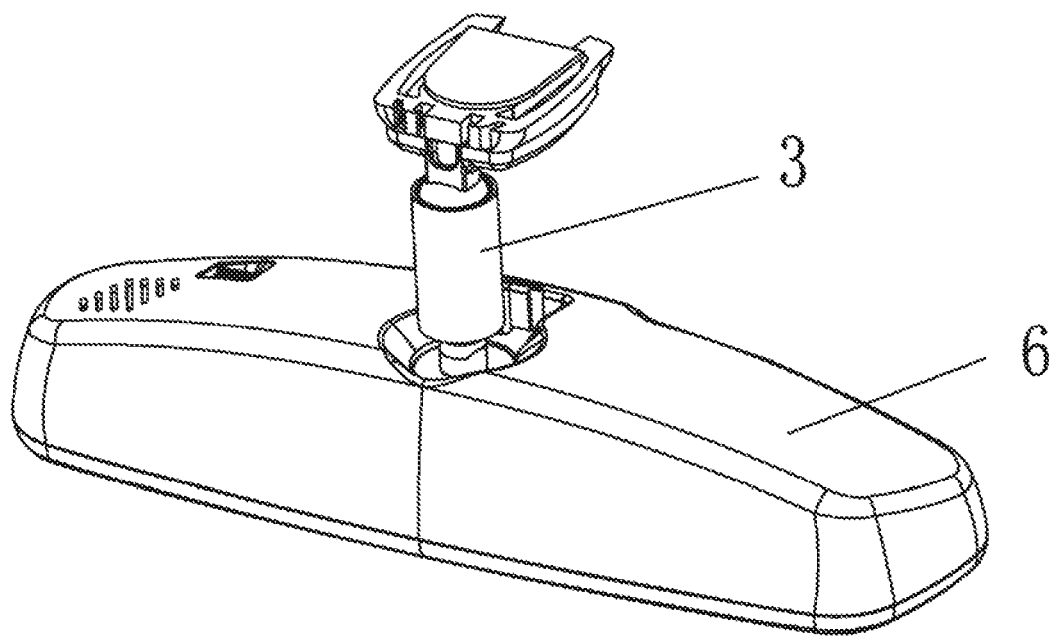
FIG. 6 is a schematic diagram of the overall appearance of Example 1 of the present application.
Figure 7:
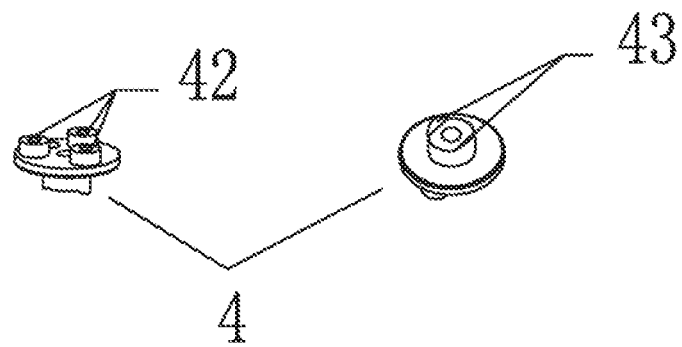
FIG. 7 is a structural schematic diagram of a connector of Example 1 of the present application.
Figure 8:
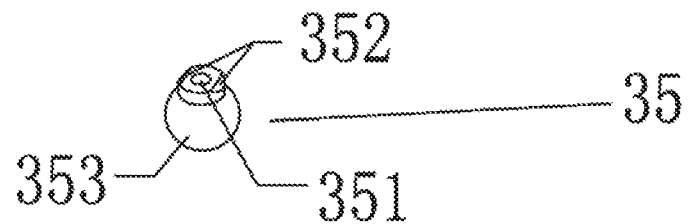
FIG. 8 is a structural schematic diagram of a conversion head of Example 1 of the present application.
Figure 9:
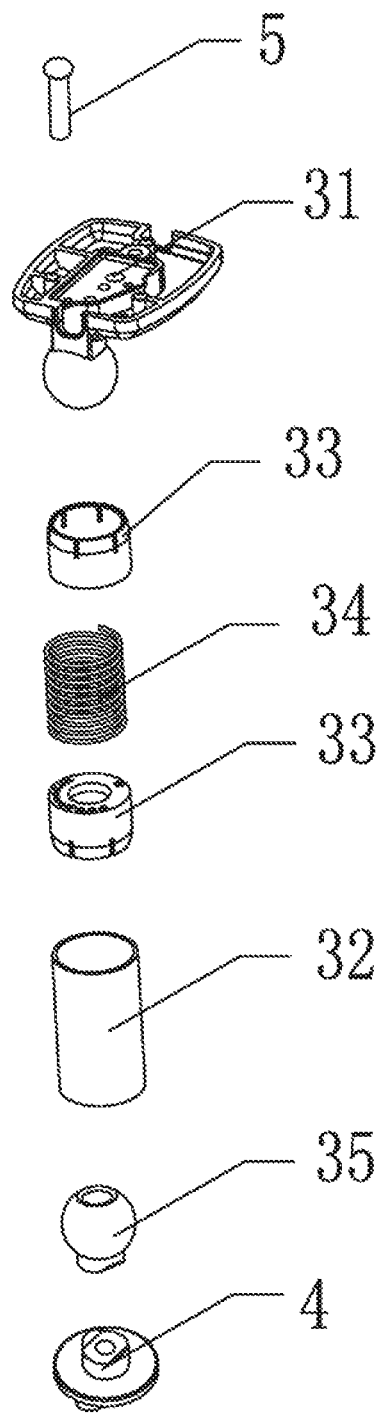
FIG. 9 is an exploded schematic diagram of the support of Example 1 of the present application.
Figure 10:
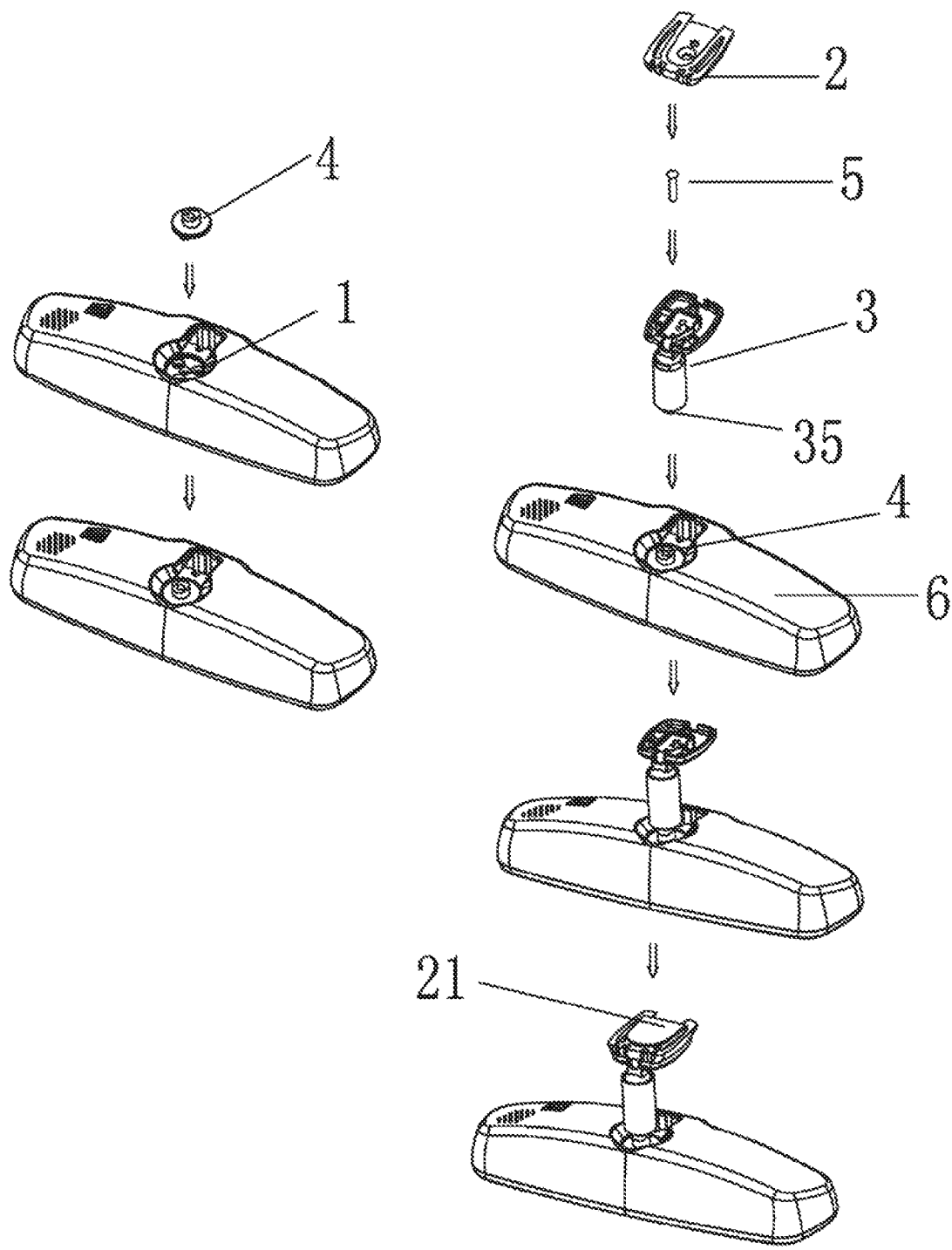
FIG. 10 is a schematic diagram of installing the replaceable support of Example 1 of the present application to the automobile interior rearview mirror.
Figure 11:
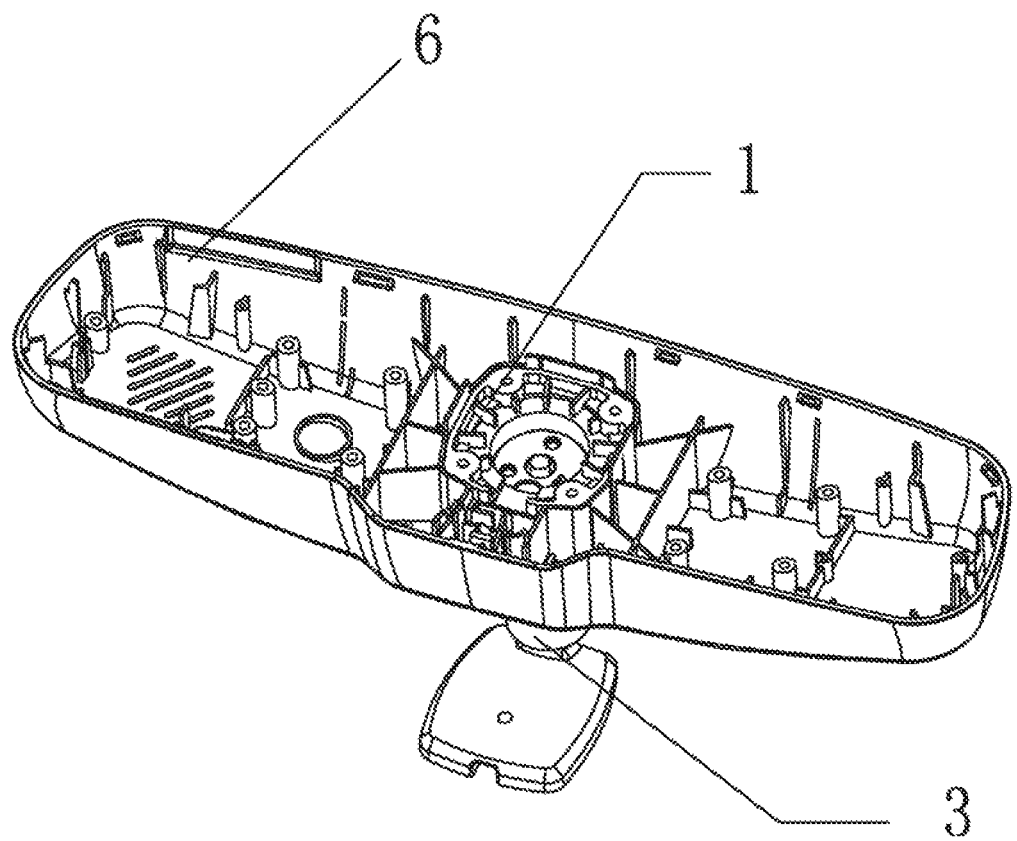
FIG. 11 is a schematic diagram showing that the replaceable support of Example 1 of the present application is connected with the automobile interior rearview mirror.
Figure 12:
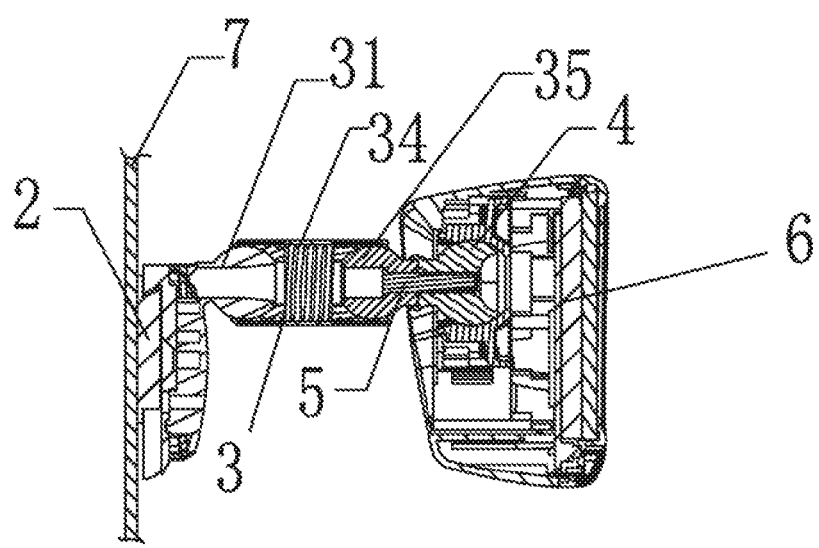
FIG. 12 is a sectional schematic diagram of a replaceable support of Example 2 of the present application and an automobile interior rearview mirror.
Figure 13:
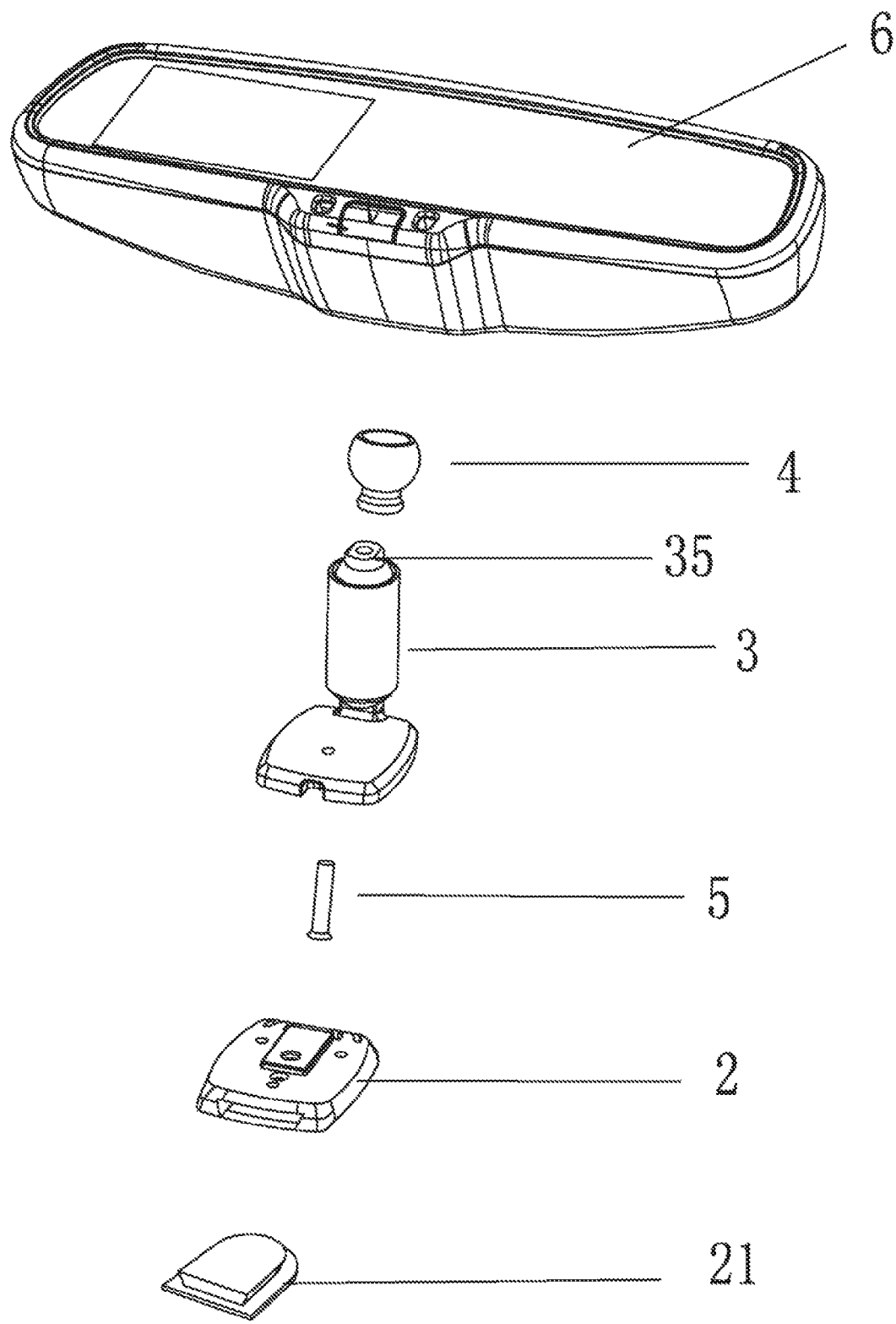
FIG. 13 is a schematic diagram of integrally assembling the replaceable support of Example 2 of the present application with the automobile interior rearview mirror.
Figure 14:
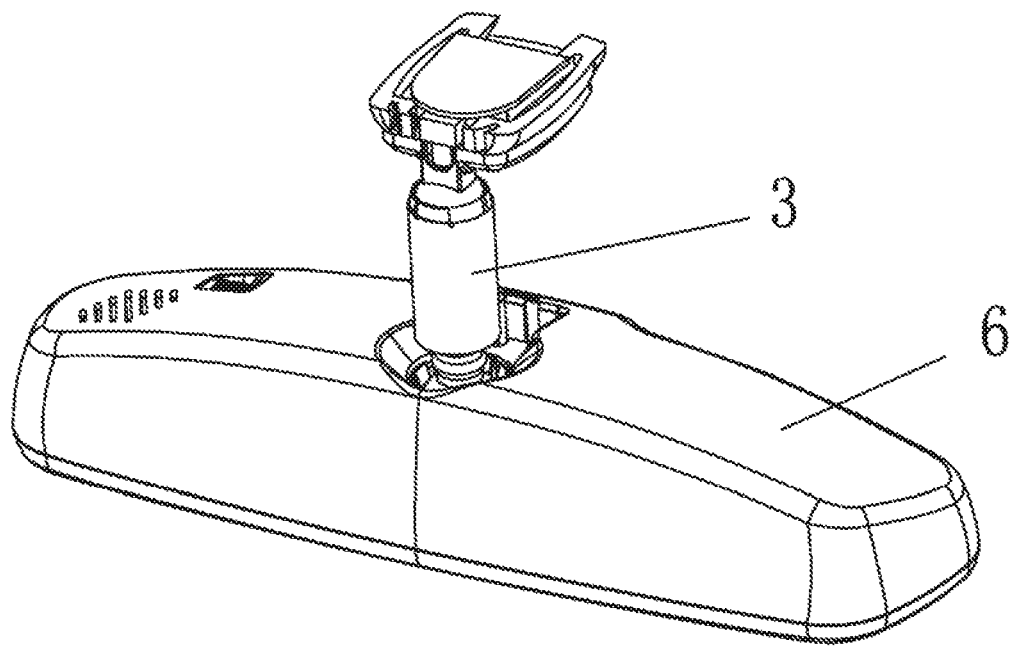
FIG. 14 is a schematic diagram of the overall appearance of Example 2 of the present application.
Figure 15:
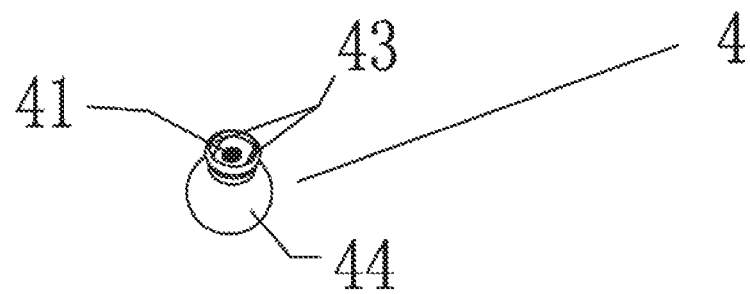
FIG. 15 is a structural schematic diagram of a connector of Example 2 of the present application.
Figure 16:
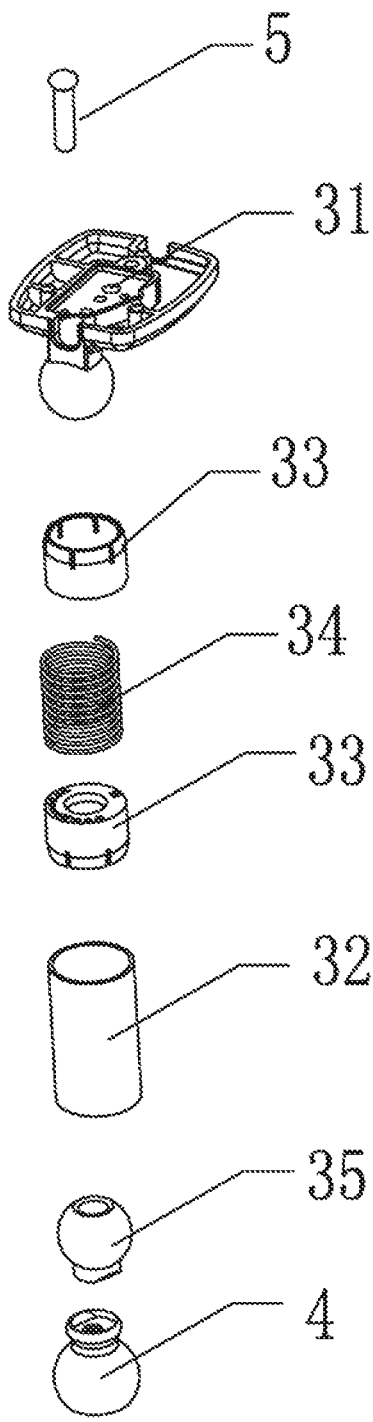
FIG. 16 is an exploded schematic diagram of the replaceable support of Example 2 of the present application.
Figure 17:
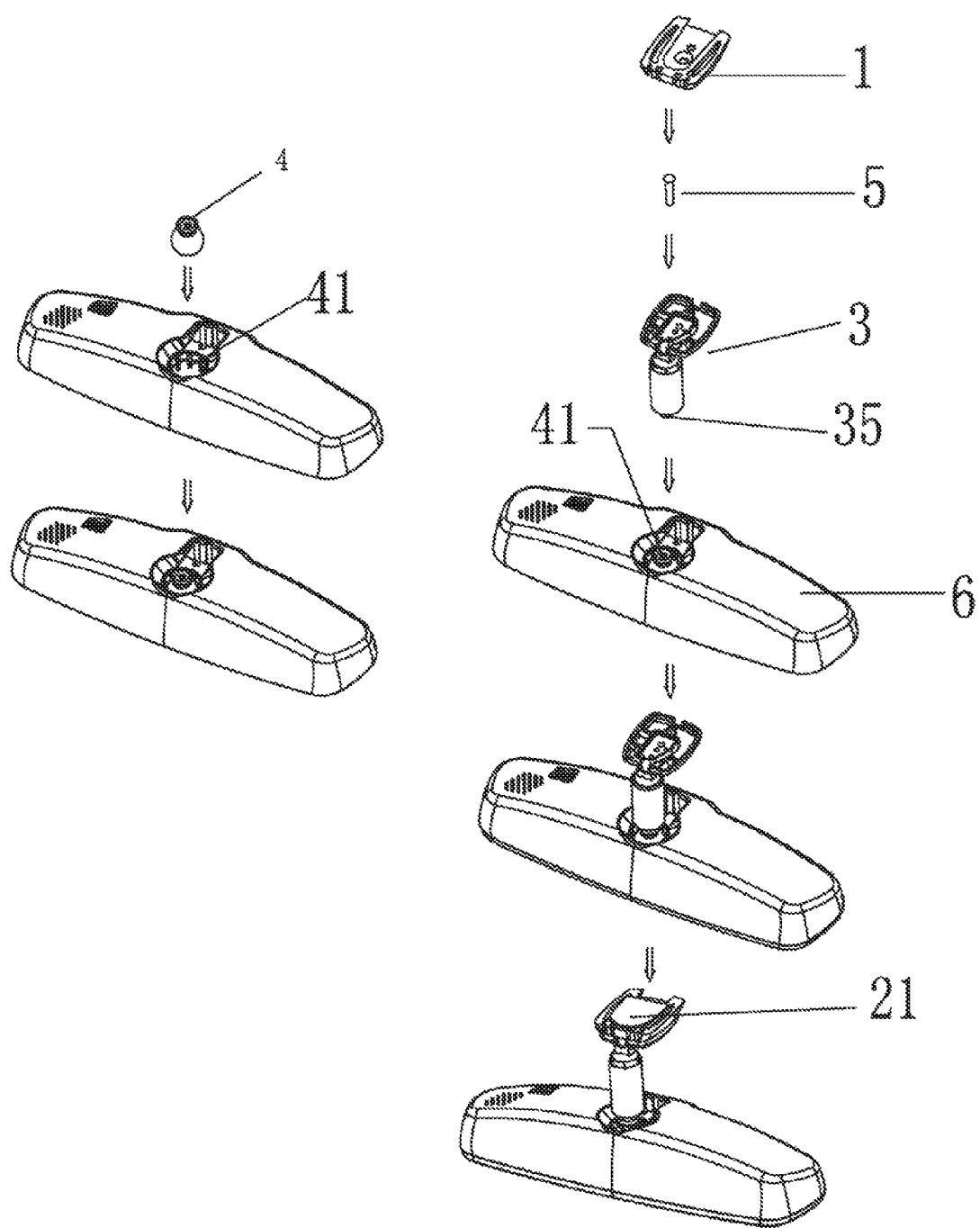
FIG. 17 is a schematic diagram of installing the replaceable support of Example 2 of the present application to the automobile interior rearview mirror.
Figure 18:
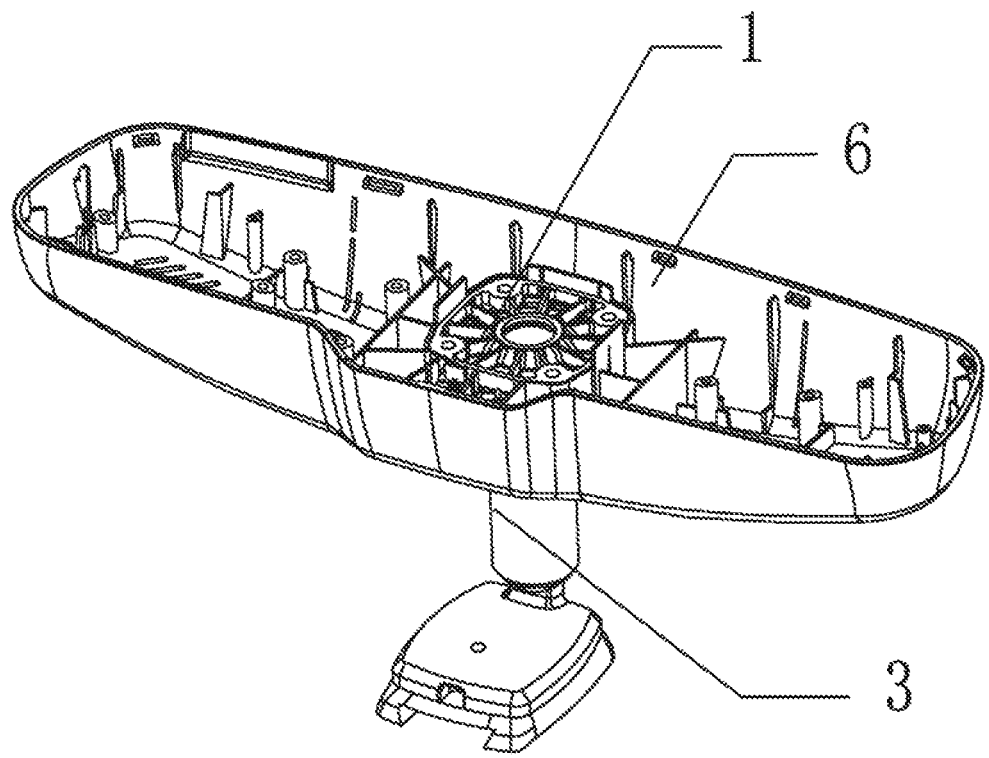
FIG. 18 is a schematic diagram showing that the replaceable support of Example 2 of the present application is connected with the automobile interior rearview mirror.

1 indicates a support base; 2 indicates an OEM base; 21 indicates a base fixing block; 3 indicates a replaceable support; 31 indicates a ball head base; 32 indicates a support pipe; 33 indicates a ball pad; 34 indicates a spring; 35 indicates a conversion head; 351 indicates a through hole; 352 indicates an outer bevel chamfer; 353 indicates a conversion ball head; 4 indicates a connector; 41 indicates a screw hole; 42 indicates a fixing column; 43 indicates an inner bevel chamfer; 44 indicates a connecting ball head; 5 indicates a fastening screw; 6 indicates a body of an automobile interior rearview mirror; 7 indicates an automobile windshield; 101 indicates a support body; 102 indicates a fixing screw; 103 indicates a ball head; 104 indicates a first connecting portion; 105 indicates a second connecting portion; 106 indicates a wire passing-through hole; 107 indicates a rod head; 108 indicates a rod body; 109 indicates a threaded hole; 201 indicates a wire.

DETAILED DESCRIPTION OF EMBODIMENTS

The present application is further described in detail by means of embodiments as follows, but it should be indicated that the scope of protection of the present application is not limited thereto.

Example 1

As shown in FIG. 4 to FIG. 11, a replaceable automobile interior rearview mirror support includes a support base 1, an OEM base 2, a base fixing block 21, and a replaceable support 3. The support base 1 is arranged in a body 6 of the automobile interior rearview mirror, the OEM base 2 is arranged on an automobile windshield 7, the base fixing block 21 is arranged below the OEM base 2, and the replaceable support 3 is arranged between the support base 1 and the OEM base 2. The replaceable support 3 includes a ball head base 31, a support pipe 32, a ball pad 33, a spring 34, and a conversion head 35. The ball head base 31 is fixed with the OEM base 2. The support base 1 is provided with a connector 4. The connector 4 is connected with the conversion head 35 on the replaceable support. A fastening screw 5 passes through the ball head base 31, the support pipe 32, the ball pad 33, the spring 34, and the conversion head 35 of the replaceable support 3 to lock and fix the connector 4. The connector 4 is provided with a screw hole 41 in a central portion thereof, a fixing column 42 matched with the support base 1 at a bottom, and inner bevel chamfers 43 at two sides, forming a round groove, at a top. The conversion head 35 is provided with a through hole 351 in a central portion thereof, outer bevel chamfers 352 at two sides, corresponding to the inner bevel chamfers 43 of the connector 4, at one end of the conversion head 35 which is connected with the connector 4, and a conversion ball head 353 at the other end of the conversion head 35.

The present example is directed to replacement of an OEM double-ball-head support. As shown in FIG. 1, since an OEM single-ball-head support is assembled in a support base of an automobile interior rearview mirror, and since the support base is installed with a rigid iron ring, it is hard to take out and replace the single-ball-head support. In order to solve this problem, some manufacturers make a separate design for the single-ball-head support to achieve replacement. However, no good solution is available in the market for replacing the double-ball-head support. This problem is solved in the present application by designing a connector in the rearview mirror and a conversion head of the replaceable support. In assembly, the connector 4 in the rearview mirror is firstly locked with the support base 1 in the rearview mirror using a bolt, the conversion head 35 is then aligned with the connector 4 in the rearview mirror, and the fastening screw 5 is finally made to pass through the ball pad 33 and the spring 34 in the support pipe 32, thereby locking the connector 4 in the rearview mirror. Thus, the whole double-ball support and the automobile interior rearview mirror form one integrated product. If replacement is needed, it only needs to unscrew the fastening screw to replace it by another double-ball support.

Example 2

As shown in FIG. 8 and FIG. 12 to FIG. 18, a replaceable automobile interior rearview mirror support comprises a support base 1, an OEM base 2, and a replaceable support 3. The support base 1 is arranged in an automobile interior rearview mirror, the OEM base 2 is arranged on an automobile windshield 7, and the replaceable support 3 is arranged between the support base 1 and the OEM base 2. The replaceable support 3 includes a ball head base 31, a support pipe 32, a ball pad 33, a spring 34, and a conversion head 35. The ball head base 31 is fixed with the OEM base 2. The support base 1 is provided with a connector 4. The connector 4 is connected with the conversion head 35 on the replaceable support. A fastening screw 5 passes through the ball head base 1, the support pipe 2, the ball pad 33, the spring 34, and the conversion head 35 of the replaceable support 3 to lock and fix the connector 4. The connector 4 is provided with a screw hole 41 in a central portion thereof, a connecting ball head 44 matched with the support base 1 at a bottom, and inner bevel chamfers 43 at two sides, forming a round groove, at a top. The conversion head 35 is provided with a through hole 351 in a central portion thereof, outer bevel chamfers 352 at two sides, corresponding to the inner bevel chamfers 43 of the connector 4, at one end of the conversion head 35 connected with the connector 4, and a conversion ball head 353 at the other end of the conversion head.

The present example is directed to replacement of a three-ball-head support. The connecting ball head 44 arranged in the rearview mirror of this example is located at the bottom of the connector 4. Since a conventional three-ball-head support includes a ball head located at a connecting portion between the three-ball-head support and the automobile interior rearview mirror, one end of the double-ball head is connected with the support base, and the other end thereof is connected with the three-ball head support. Due to the tight squeeze of the support base, it is very hard to manually replace the support easily. The present application makes a separate design, that is, the three-ball head support is modified to include two portions, one portion being the connector 4 in the rearview mirror, and the other portion being the conversion head 35. In assembly, the connector 4 in the rearview mirror is firstly pressed into the support base 1 of the automobile interior rearview mirror using a fixture. If the three-ball-head support needs to be replaced, a replaceable support 3 with a double ball head is firstly connected with the connector, 4 inside the rearview mirror, then a fastening screw is made to pass through the ball pad 33 and the spring 34 in the support pipe 32, then the replaceable support 3 having the conversion head 35 is secured with the connector. 4 in the rearview mirror, and after secured, the ball head base 31 is assembled with the OEM base 2, thereby finishing the replacement of the three-ball-head support. In order to improve strength of the whole combined support, the replaceable support 3 in the present application is manufactured by a zinc alloy die-casting process, which makes the replaceable support not only environment-friendly and rigid, but also of certain strength. The OEM base 2 is equipped to the original automobile, and the replaceable support 3 which has the conversion head 35 is fixed, through the fastening screw, with the connector 4 which is placed in the automobile inner rearview mirror.

Figure 19:
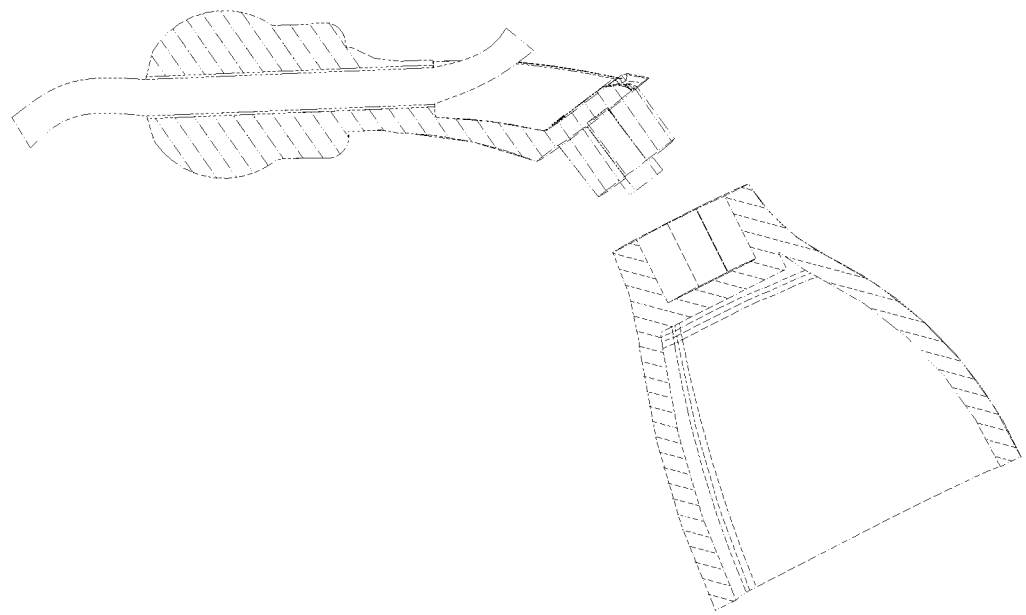
FIG. 19 is a structural schematic diagram of a rearview mirror support in the prior art.
Figure 20:
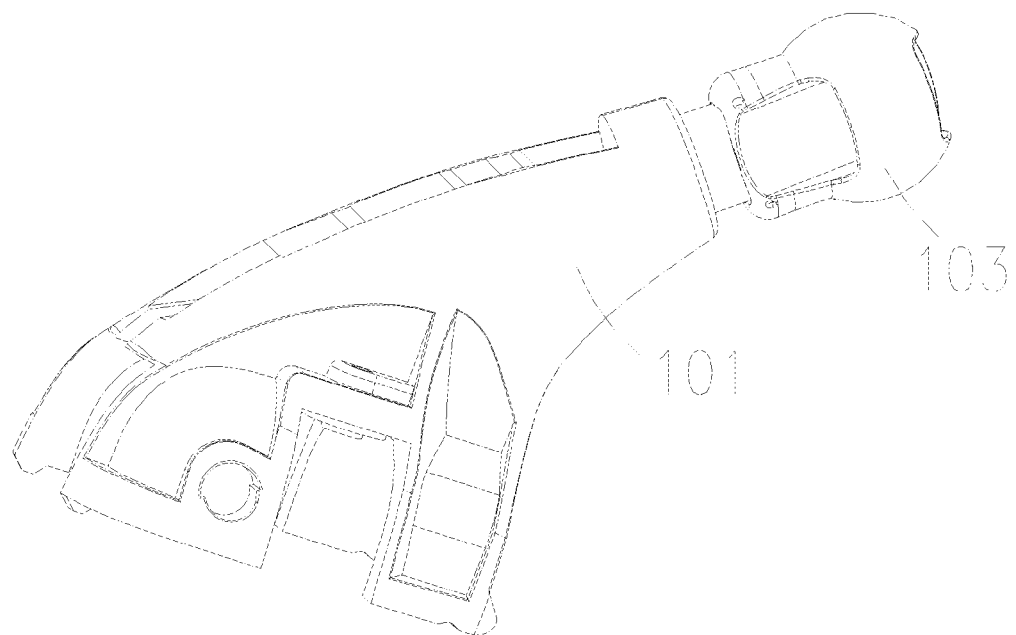
FIG. 20 is an axonometric drawing of the rearview mirror support having a screw for locking at a front face and a wire passing at a side face provided in Example 1 of the present application.
Figure 21:
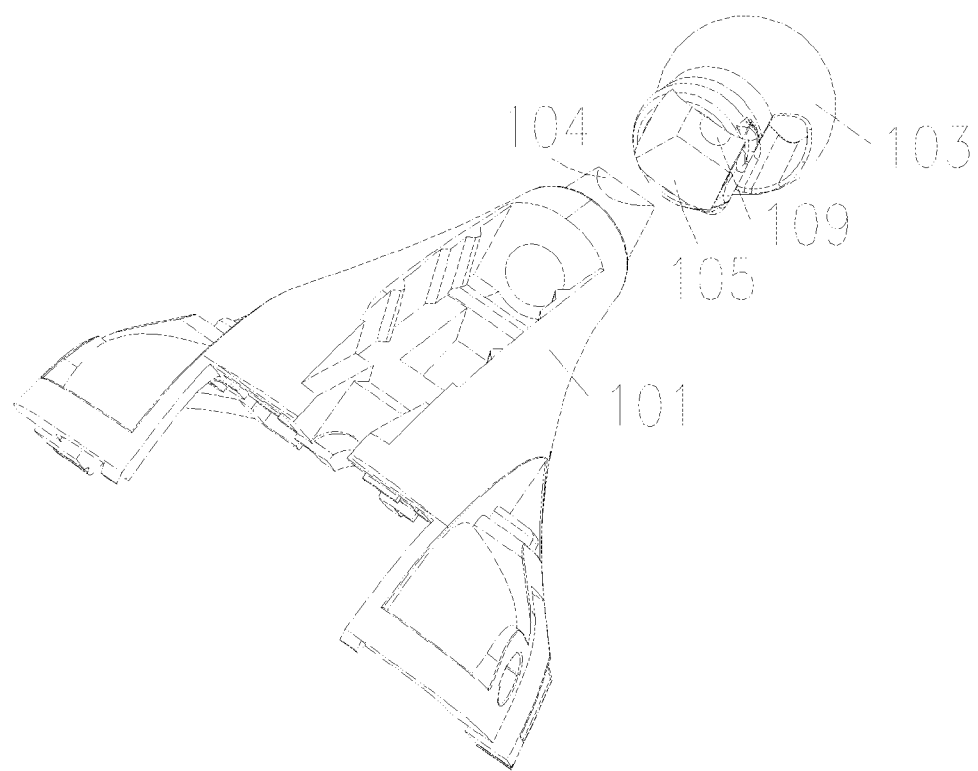
FIG. 21 is an exploded view of the rearview mirror support having a screw for locking at a front face and a wire passing at a side face provided in Example 1 of the present application.
Figure 22:
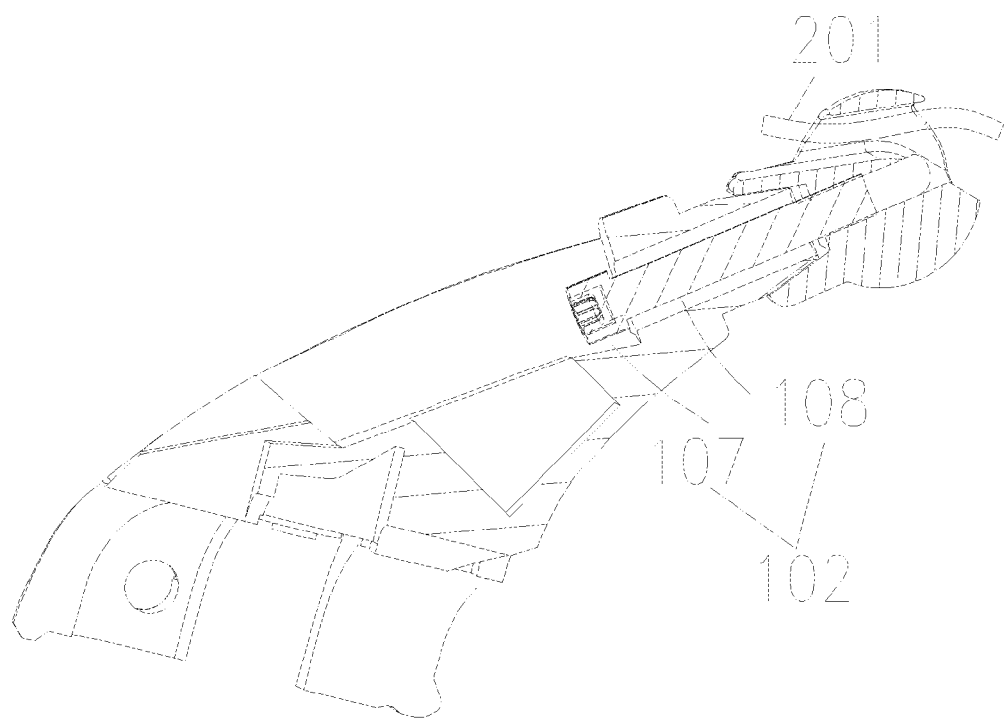
FIG. 22 is a sectional view of the rearview mirror support having a screw for locking at a front face and a wire passing at a side face provided in Example 1 of the present application.
Figure 23:
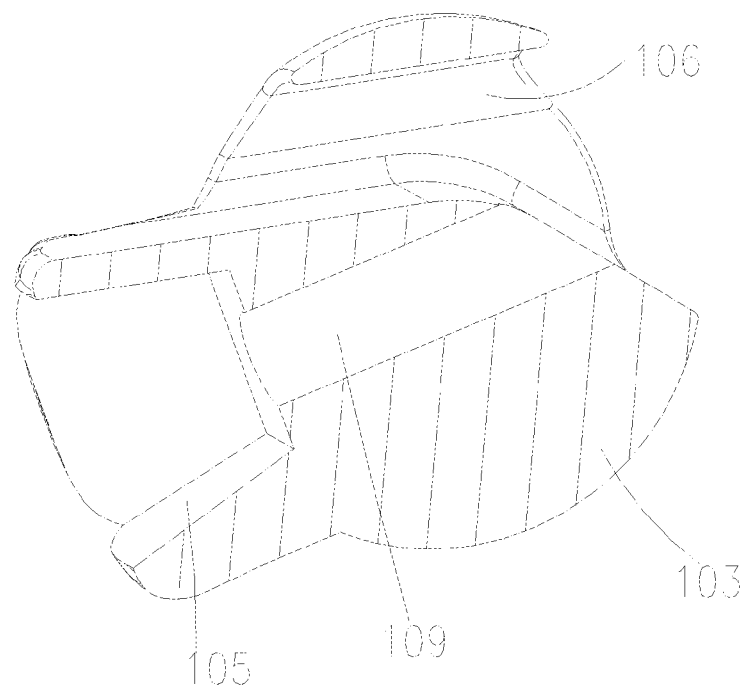
FIG. 23 is a sectional view of a ball head of the rearview mirror support having a screw for locking at a front face and a wire passing at a side face provided in Example 1 of the present application.

Besides, rearview mirror supports in the prior art are not practical enough and easily cause shaking of the rearview mirror, which the inventor found after long-term research is due to unreasonable structure design. An automobile interior rearview mirror support common in the market is as shown in FIG. 19. In such rearview mirror support, a bolt is used to connect a support in a middle portion, a ball head and a support arm are integrated, and a wire support passes through the ball head on the support arm. A support ball inside the existing rearview mirror extends outwardly too much, such that a wire can pass through the support ball to extend out, however the total length of the rearview mirror support is greatly increased, which makes it hard to install the rearview mirror support to some types of automobiles perfectly. Moreover, many types of automobiles, if the rearview mirror support is to be mounted complying with safety standard requirements, would have the whole rearview mirror support very long, which is quite unpleasing. A too long support further makes the rearview mirror easy to shake.

Given this, in order to improve this situation, the inventor of the present application, who has made some improvements on the rearview mirror supports, invented a rearview mirror support having a screw for locking at a front face and a wire passing at a side face, which can well improve the above mentioned situation.

Referring to FIG. 20 to FIG. 26, the rearview mirror support having a screw for locking at a front face and a wire passing at a side face provided in the present embodiment comprises a support body 101, a fixing screw 102, and a ball head 103 which are connected, wherein the support body 101 comprises a first connecting portion 104, and the ball head 103 comprises a second connecting portion 105, wherein the first connecting portion 104 and the second connecting portion 105 are connected, the fixing screw 102 passes through the first connecting portion 104 and the second connecting portion 105 to be connected with the ball head 103; a side portion of the ball head 103 is provided with a wire passing-through hole 106 through this ball head 103.

Such rearview mirror support having a screw for locking at a front face and a wire passing at a side face can be called as a rearview mirror support or a support, for short.

The support body 101 and the ball head 103 are main structural parts of this rearview mirror support. The ball head 103 is used for connecting a rearview mirror body, the support body 101 is used to mount the rearview mirror onto the automobile, and the fixing screw 102 is used to connect the support body 101 and the ball head 103. In such rearview mirror support, detachable connection between the support body 101 and the ball head 103 is realized through the fixing screw 102, so that various parts are conveniently processed, it is also quite easy to assemble, and subsequent maintenance also saves time and effort.

The support body 101 and the ball head 103 are further connected through the first connecting portion 104 and the second connecting portion 105. In assembly, the first connecting portion 104 and the second connecting portion 105 are firstly connected, and then they are connected with the fixing screw 102. The configuration of connecting the first connecting portion 104 and the second connecting portion 105 makes it convenient to assemble the support body 101 and the ball head 103.

The side portion of the ball head 103 is provided with the wire passing-through hole 106. The wire passing-through hole 106 is used for allowing a wire 201 to pass therethrough, so that the rearview mirror can be conveniently connected with an electrical system of the automobile.

In such rearview mirror support, the support body 101 and the ball head 103 are connected through the fixing screw 102, the wire passing-through hole 106 is provided at a non-central position on the side portion of the ball head 103, and the fixing screw 102 is provided at a position of the ball head 103 relatively close to a middle portion. With such manner of arrangement, the whole rearview mirror support can be made relatively short and relatively small, so that it easily complies with relevant safety standard requirements, thus the rearview mirror glass cannot sway or shake easily after the rearview mirror body is connected.

Therefore, the structural design of such rearview mirror support having a screw for locking at a front face and a wire passing at a side face is reasonable, the size of the rearview mirror support is relatively short and small, facilitating assembly and utilization, so that phenomena such as shaking of the rearview mirror in use do not easily occur, the reliability of products is improved, and the failure rate is reduced, which is in favor of marketing.

Moreover, the screw is used for locking in the central position, and the wire passing-through hole 106 is formed at the side face of the ball head 103 for allowing the wire to pass therethrough, so that the wire inside the rearview mirror can more smoothly leave the rearview mirror. Thus, not only the support is connected and fixed, but also the wire extends out of the rearview mirror.

The connection between the first connecting portion 104 and the second connecting portion 105 facilitates connection of the support 101 and the ball head 103, and also facilitates installation of the fixing screw 102. Optionally, the first connecting portion 104 has an outward-projecting structure, and the second connecting portion 105 has an inward-recessed structure.

It is relatively convenient to assemble the first connecting portion 104 and the second connecting portion 105 having such structures.

The first connecting portion 104 and the second connecting portion 105 have the projecting structure and the recessed structure respectively. Preferably, an outer profile of the first connecting portion 104 and an inner profile of the second connecting portion 105 are matched. With such configuration, the two portions achieve a higher degree of cooperation, and they are more stable after the connection.

In order to make the support body 101 and the ball head 103 not rotate relatively to each other after the first connecting portion 104 and the second connecting portion 105 are connected, the outer profile of the first connecting portion 104 has a polyhedron structure. The first connecting portion 104 and the second connecting portion 105 having such structures can serve a stop function, and after connection, the support body 101 and the ball head 103 will not rotate, facilitating utilization.

Preferably, the side face of the first connecting portion 104 is an oblique face. The structure of the oblique face facilitates assembly and has a higher fitting degree.

In some examples, the inner profile of the second connecting portion 105 and the outer profile of the first connecting portion 104 are matched, and the outer profile of the first connecting portion 104 is a square pyramid. As shown in the figures, the first connecting portion 104 and the second connecting portion 105 having such structures, on one hand, facilitate processing and assembly, and on the other hand, result in a relatively high fitting degree and a relatively good stop function after assembly, and can prevent relative rotation of the support body 101 and the ball head 103.

The fixing screw 102 is used to fix the support body 101 and the ball head 103. Specifically, the fixing screw 102 comprises a rod head 107 and a rod body 108 which are connected. The rod head 107 is located at the outside of the first connecting portion 104. As shown in the figures, various parts with such positional relationship facilitate assembly and maintenance.

More specifically, the ball head 103 is provided with a threaded hole 109. This threaded hole 109 communicates with the second connecting portion 105. An axis of the threaded hole 109 is overlapped with the axis of the ball head 103. Such positional features make more stable the connection between the support body 101 and the ball head 103.

Optionally, an axis of the wire passing-through hole 106 crosses an axis of the threaded hole 109. Such relationship makes the axis of the wire passing-through hole 106 tilted so that the wire 201 can conveniently pass therethrough.

Figure 24:
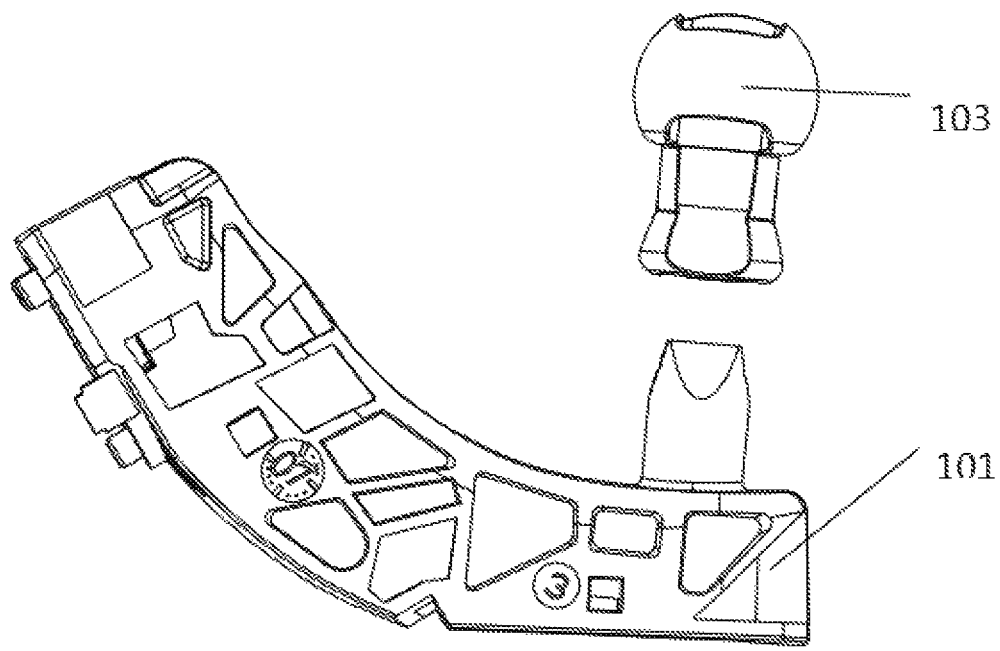
FIG. 24 is an exploded view of the rearview mirror support having a screw for locking at a front face and a wire passing at a side face provided in Example 2 of the present application.
Figure 25:
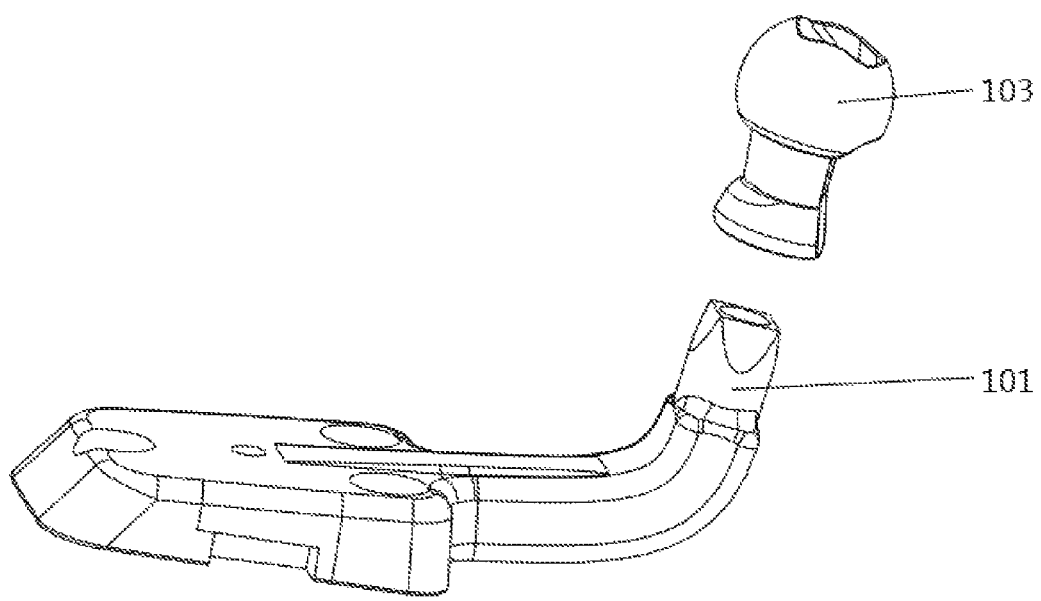
FIG. 25 is an exploded view of a rearview mirror support having a screw for locking at a front face and a wire passing at a side face provided in Example 3 of the present application.
Figure 26:
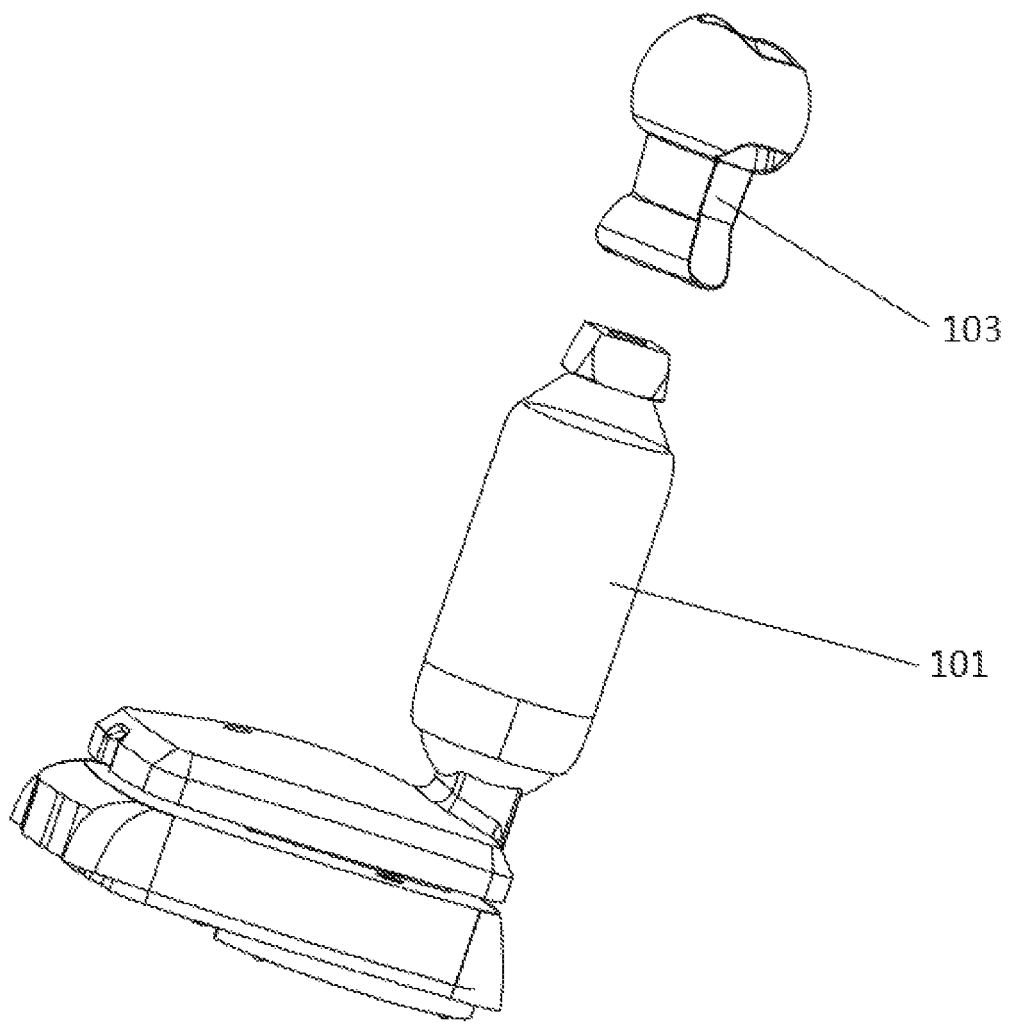
FIG. 26 is an exploded view of a rearview mirror support having a screw for locking at a front face and a wire passing at a side face provided in Example 4 of the present application.

The support is used to be connected with the automobile body, and can have various structures. For example, the support body 101 is in an L shape or an arc shape. As shown in FIG. 24 to FIG. 26, all of the supports with these structures can realize its function.

In order to clearly illustrate the present application, some examples are given in the present embodiment.

In one example, it provides a rearview mirror support having a screw for locking at a front face and a wire passing at a side face, comprising a support body 101, a fixing screw 102, and a ball head 103 which are connected, wherein the support body 101 comprises a first connecting portion 104, and the ball head 103 comprises a second connecting portion 105, wherein the first connecting portion 104 and the second connecting portion 105 are connected with each other, the fixing screw 102 passes through the first connecting portion 104 and the second connecting portion 105 to be connected with the ball head 103; a side portion of the ball head 103 is provided with a wire passing-through hole 106 through this ball head 103.

The first connecting portion 104 has an outward-projecting structure, and the second connecting portion 105 has an inward-recessed structure.

An inner profile of the second connecting portion 105 and an outer profile of the first connecting portion 104 are matched, and the outer profile of the first connecting portion 104 is a square pyramid.

The fixing screw 102 comprises a rod head 107 and a rod body 108 which are connected with each other. The rod head 107 is located at the outside of the first connecting portion 104. The ball head 103 is provided with a threaded hole 109, wherein the threaded hole 109 communicates with the second connecting portion 105, and an axis of the threaded hole 109 is overlapped with an axis of the ball head 103. An axis of the wire passing-through hole 106 crosses an axis of the threaded hole 109.

In another example, it provides a rearview mirror support having a screw for locking at a front face and a wire passing at a side face, comprising a support body 101, a fixing screw 102, and a ball head 103 which are connected, wherein the support body 101 comprises a first connecting portion 104, and the ball head 103 comprises a second connecting portion 105, wherein the first connecting portion 104 and the second connecting portion 105 are connected, the fixing screw 102 passes through the first connecting portion 104 and the second connecting portion 105 to be connected with the ball head 103; a side portion of the ball head 103 is opened with a wire passing-through hole 106 through this ball head 103.

The first connecting portion 104 has an outwardly projecting structure, and the second connecting portion 105 has an inwardly recessed structure.

An inner profile of the second connecting portion 105 and an outer profile of the first connecting portion 104 are matched, and the outer profile of the first connecting portion 104 is a square pyramid.

The fixing screw 102 comprises a rod head 107 and a rod body 108 which are connected. The rod head 107 is located at the outside of the first connecting portion 104. The ball head 103 is provided with a threaded hole 109, wherein the threaded hole 109 communicates with the second connecting portion 105, and an axis of the threaded hole 109 is overlapped with an axis of the ball head 103. An axis of the wire passing-through hole 106 is parallel to an axis of the threaded hole 109.

In another example, it provides a rearview mirror support having a screw for locking at a front face and a wire passing at a side face, comprising a support body 101, a fixing screw 102, and a ball head 103 which are connected, wherein the support body 101 comprises a first connecting portion 104, and the ball head 103 comprises a second connecting portion 105, wherein the first connecting portion 104 and the second connecting portion 105 are connected, the fixing screw 102 passes through the first connecting portion 104 and the second connecting portion 105 to be connected with the ball head 103; a side portion of the ball head 103 is provided with a wire passing-through hole 106 through this ball head 103.

The first connecting portion 104 has an outward-projecting structure, and the second connecting portion 105 has an inward-recessed structure.

An inner profile of the second connecting portion 105 and an outer profile of the first connecting portion 104 are matched, and the outer profile of the first connecting portion 104 is a square pyramid.

The fixing screw 102 comprises a rod head 107 and a rod body 108 which are connected. The rod head 107 is located at the outside of the first connecting portion 104. The ball head 103 is provided with a threaded hole 109, wherein the threaded hole 109 communicates with the second connecting portion 105, and an axis of the threaded hole 109 is overlapped with an axis of the ball head 103. An axis of the wire passing-through hole 106 crosses the axis of the threaded hole 109. The support body 101 is in an arc shape.

In another example, it provides a rearview mirror support having a screw for locking at a front face and a wire passing at a side face, comprising a support body 101, a fixing screw 102, and a ball head 103 which are connected, wherein the support body 101 comprises a first connecting portion 104, and the ball head 103 comprises a second connecting portion 105, wherein the first connecting portion 104 and the second connecting portion 105 are connected, the fixing screw 102 passes through the first connecting portion 104 and the second connecting portion 105 to be connected with the ball head 103; a side portion of the ball head 103 is provided with a wire passing-through hole 106 through this ball head 103.

The first connecting portion 104 has an outward-projecting structure, and the second connecting portion 105 has an inward-recessed structure.

An inner profile of the second connecting portion 105 and an outer profile of the first connecting portion 104 are matched, and the outer profile of the first connecting portion 104 is a square pyramid.

The fixing screw 102 comprises a rod head 107 and a rod body 108 which are connected. The rod head 107 is located at the outside of the first connecting portion 104. The ball head 103 is provided with a threaded hole 109, wherein the threaded hole 109 communicates with the second connecting portion 105, and an axis of the threaded hole 109 is overlapped with an axis of the ball head 103. An axis of the wire passing-through hole 106 is parallel to the axis of the threaded hole 109. The support body 101 is in an L shape. Although the embodiments of the present application are described in conjunction with the figures, various variations or modifications, which can be made by those skilled in the art within the scope of the appended claims, should fall within the scope of protection of the present application, as long as they are not beyond the scope of protection defined in the claims of the present application.

The invention claimed is:

1. A replaceable automobile interior rearview mirror support, comprising a support base arranged in an automobile interior rearview mirror and an original equipment manufacturer (OEM) base arranged on an automobile windshield, wherein the replaceable automobile interior rearview mirror support further comprises a replaceable support arranged between the support base and the OEM base, the replaceable support comprises a ball head base, a support pipe, and a conversion head, the ball head base is fixed with the OEM base, the support base is provided with a connector, the connector is connected with the conversion head on the replaceable support, and the connector is fixed with the replaceable support through a fastening screw; the fastening screw passes through the ball head base, the support pipe, a ball pad, a spring, and the conversion head of the replaceable support, to secure the connector, a connecting ball head is located at a bottom of the connector, one end of the connector connected with the conversion head is provided with inner bevel chamfers at two sides, forming a round groove, and one end of the conversion head connected with the connector is provided with outer bevel chamfers at two sides, with the outer bevel chamfers matched with the inner bevel chamfers at two sides of the connector.

2. The replaceable automobile interior rearview mirror support according to claim 1, wherein the spring and the ball pad are arranged in the support pipe of the replaceable support.

3. The replaceable automobile interior rearview mirror support according to claim 1, wherein the connector is provided with a screw hole in a central portion of the connector, with the screw hole having a circular groove.

4. The replaceable automobile interior rearview mirror support according to claim 1, wherein the conversion head is provided with a through hole in a central portion of the conversion head.

\* \* \* \* \*

UNITED STATES PATENT AND TRADEMARK OFFICE
CERTIFICATE OF CORRECTION

PATENT NO. : 10,017,118 B2
APPLICATION NO. : 15/204778
DATED : July 10, 2018
INVENTOR(S) : Lei Pan Page 1 of 1

It is certified that error appears in the above-identified patent and that said Letters Patent is hereby corrected as shown below:

On the Title Page

In item (71), in "Applicant", in Column 1, Line 2, after "Shenzhen", insert --, Guangdong--

In item (30), in "Foreign Application Priority Data", in Column 1, Line 1, delete "2014 2 0434347 U" and insert --201420434347.2-- therefor On page 2, in Column 2, under "Other Publications", Line 10, delete "Preliminayr" and insert --Preliminary-- therefor On page 2, in Column 2, under "Other Publications", Line 22, delete "Amendmen" and insert --Amendment-- therefor On page 2, in Column 2, under "Other Publications", Line 22, before "in", delete "t"

In the Claims

In Column 10, Line 67, in Claim 1, after "screw;", insert --¶--

Signed and Sealed this
Fourth Day of June, 2019

Andrei Iancu
*Director of the United States Patent and Trademark Office*